July 23, 1968   A. S. IRWIN   3,393,575

BALL SCREW ACTUATOR

Filed May 31, 1966

INVENTOR.
ARTHUR S. IRWIN
BY
George C. Bower
his ATTORNEY

United States Patent Office 3,393,575
Patented July 23, 1968

3,393,575
BALL SCREW ACTUATOR
Arthur S. Irwin, Jamestown, N.Y., assignor to TRW Inc., Euclid, Ohio, a corporation of Ohio
Filed May 31, 1966, Ser. No. 554,064
3 Claims. (Cl. 74—424.8)

ABSTRACT OF THE DISCLOSURE

The ball screw actuator comprises a rotatable shaft with single thread and groove and two sets of single turn nuts mounted in two housings drawn together by bolts to preload the balls between the nuts and shaft.

---

This relates to the copending application Ser. No. 554,065 of Burnette J. Carlson, filed May 31, 1966.

Background of the invention

This invention relates to ball screw actuators and is directed particularly to preloaded ball screw actuators.

In previous ball screw actuators having individual single turn nuts for a uniform loading of the balls difficulties have been encountered in securing a uniform preloading of the nuts. The manufacture and assemblage is complicated, resulting in higher manufacturing costs and longer assembling time. In order to maintain the preload the nuts are keyed together. This requires the insertion of shims between the nuts in order to align the keyways and to secure the proper spacing for a uniform preload of the balls in each nut. It is desirable to simplify the manufacturing and assemblage of the actuators by retaining the position and uniformity of preload without the use of a keying means. In order to provide a simpler manufacture and assemblage the preloading should be a separate operation from the locking of the nuts of the ball screw actuator.

Summary of the invention

A ball screw actuator has a plurality of single turn nuts formed into two sets evenly preloaded in opposite directions on a threaded shaft and mounted in a two piece housing bolted together holding the nuts in the preloaded condition and in proper axial relation.

An object of the invention is to provide a ball screw actuator which has a minimum number of parts and is easy to manufacture and assemble.

Another object of the invention is to provide a ball screw actuator which does not require shims between the nuts to produce the desired preload on each nut.

Another object of the invention is to provide a ball screw actuator that may be readily assembled, taken apart and reassembled by ordinary machine tools.

Another object of the invention is to provide a ball screw actuator in which the amount of preload is determined separate from the locking of the nuts together.

Other and further objects and advantages will be apparent from the description taken in connection with the drawing.

Detailed description

Figure 1:
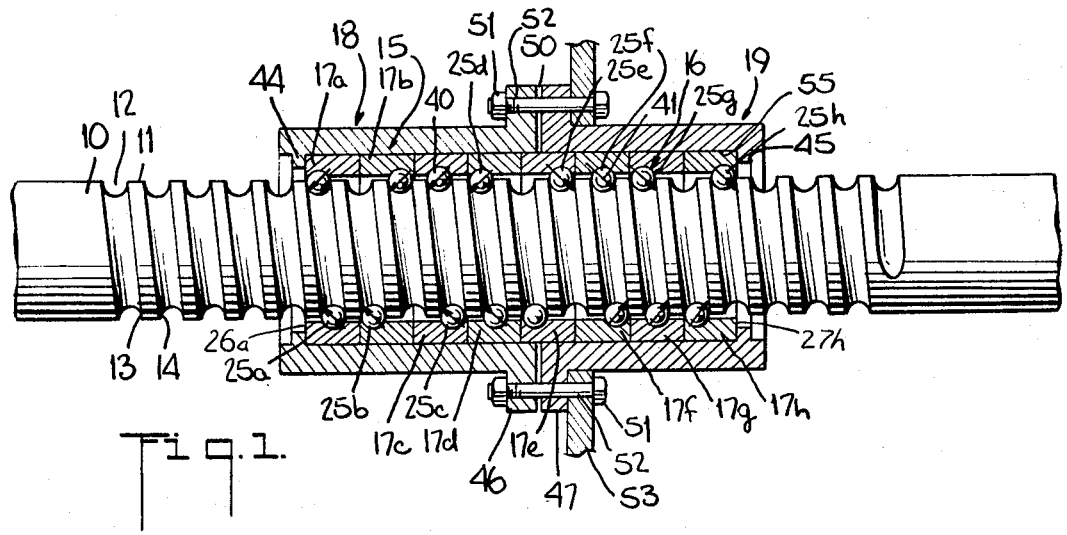
FIG. 1 illustrates a ball screw actuator with the eight nuts in contacting force transmitting relation.

The embodiment of the ball screw actuator shown in FIG. 1 comprises a threaded shaft 10, two sets 15, 16 of nuts 17a–d, 17e–h with balls 25a–h and housings 18, 19. The shaft 10 is rotatably mounted and has a thread 11 forming groove 12 defined by the faces 13 and 14 of the thread. The shaft 10 and nuts 17a–h move rotatably and linearly relative to one another.

Figure 2:
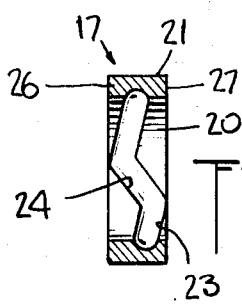
FIGS. 2 and 3 illustrate the interior of the nuts.
Figure 3:
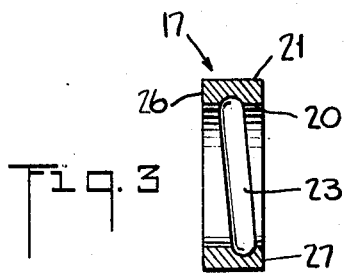

The nuts 17a–h are identical and sectional views of the halves of a nut 17 are illustrated in FIGS. 2 and 3. The nut is ring-shaped and has an inner cylindrical surface 20 and an outer cylindrical surface 21. On opposite sides are flat annular side surfaces 26, 27 extending normal to the central axis of the nut.

The inner surface has a diameter slightly greater than the diameter of the crest of the threads to move clear of the shaft. A load bearing helical groove 23 of slightly less than one turn and a crossover 24 connecting the ends of the groove 23 are formed in the inner surface. Thus the balls 25 are held captive within a nut to form a continuous row of recirculating balls. The groove 23 has the same pitch as the thread 11 and groove 12 on the shaft 10. The depth of the groove 23 is about equal to the radius of the bearing balls 25, and the depth of the groove 12 is less than the radius of the bearing balls to form a substantial interconnection for the transmission of forces.

The crossover groove 24 connects the ends of the groove 23 and has a depth varying in relation to the thread to permit the balls to cross back over the thread 11 while remaining in contact with the thread and the nut. No load forces are transmitted by the balls 25 in the groove 24. The load forces are transmitted by the balls in the groove 23 and groove 12.

The housings 18, 19 have cylindrical casings 42, 43 with inner cylindrical walls 54, 55, respectively, of slightly greater diameter than the outer surfaces 21a–h of the nuts 17a–h. This provides a clearance between the housing and nuts to avoid transferring any out-of-round of the housing to the nuts.

The housing has inwardly extending flanges 44, 45, respectively at opposite ends. The flanges overlap and engage the exterior side surfaces 26a, 27h of the nuts 17a, 17h. At adjacent ends of the housings are outwardly extending flanges 46, 47 connected to the member 53 by the circumferentially distributed nuts 51 and bolts 52. The flanges 46, 47 are circumferentially separated by the space 50 for a firm holding of the nuts 17a–h between the flanges 44, 45 and transmission of forces.

The essential feature of ball screw actuators of this type is to attain an equal transmission of load through the load transmitting balls of a given set of nuts. This equal loading is attained by rotating the nuts 17d, 17e of sets 15, 16, respectively, against one another and applying a given torque thereto. The balls 25d, 25e carried by the nuts 17d, 17e, respectively, are subjected to compressive forces 40, 41 which are at an angle to the shaft. The forces are applied between the side surfaces of the grooves 23 and the groove surfaces 13 and 14, respectively. The axial components of the forces are in opposite directions.

The nuts 17c and f are rotated against the nuts 17d and e, respectively. Torques equal to the torques applied to the nuts 17d and e are applied to the nuts 17c and f to place the balls in the respective nuts under compressive forces equal to the forces on the balls of the nuts 17d and e. The balls of the nuts 17a and b, 17g and h are similarly placed under compression. The nuts 17a–d are axially oppositely loaded to the nuts 17e–h. Thus two sets 15 and 16 of nuts are formed for carrying loads applied in opposite directions to the actuator. The application of equal torques to the nuts on seating properly positions the nuts in relation to the shaft 10, so that the loads between the shaft and member 53 are equally distributed between the load carrying balls of a given set of nuts.

It is also desirable to compress the load carrying balls so that there is no or only a slight dimensional change when the load is applied. Thus the given torque applied to the seating of the nuts against one another includes an additional torque to further compress the balls so as not to substantially change a dimension on the application of a load. Thus the given torque applied to the nuts includes the equal loading of the load carrying balls and the compression of the balls to avoid dimensional changes resulting in relative linear movement between the nuts and the shaft without a corresponding rotational movement.

In addition to the equal distribution of the load between the load carrying balls, it is also desirable to distribute the load transmitting capacity circumferentially. The non-loading transmitting crossover grooves are, therefore, circumferentially staggered. This staggered relation is attained by the relation of the axial widths of the rings and the shaft thread lead.

The axial width of the nut is a function of the lead of the thread on the shaft to provide a given circumferential spacing of the crossover grooves. The nut must have an axial width to accommodate a load groove 23 of approximately one revolution, which is one thread lead or pitch. In addition the ball diameter and wall thickness at the shoulder of the groove must be taken into consideration. This will result in the axial width of the nut being a fraction of the lead greater than one lead. This fraction determines the circumferential distribution of the crossover grooves. In the embodiment shown in the drawing four nuts form an assemblage. The axial width of each nut is 1⅔ times the lead or pitch of the thread. Thus on seating of the side surfaces the contacting nuts will have the crossover grooves 120° apart. For circumferential spacing of 90°, 180° or 270° the axial widths of the nuts are 1¼, 1½ and 1¾ respectively. In addition to thread pitch or lead, bearing ball size and race shoulder thickness, the avoidance of rocking action is desired. For example, a circumferential spacing of 180° of the crossover grooves results in the nut assembly rocking, causing the screw to bind.

On application of a load to the flange 46 in a right hand direction, the load is transmitted through the housing flange 44 to the nuts 17a–h. The load is transmitted through the balls 25e–h since the compression forces on the balls and the application of the load are in the same direction. Since the balls are compressed, the linear movement is substantially minimized on transference of this load. On rotation of the housings 18 and 19 all of the nuts participate in the relative rotation between the housings and the shaft. If the applied forces are reversed in direction and are applied to the flange 47 towards the left, then the balls 25a–d transmit the forces since the compression forces of these balls are in the same direction as the applied load. Again, however, there is a minimum of relative linear movement between the nuts and the shaft due to the compression of the balls in the direction of the compressive forces 40.

It is thus seen from the foregoing embodiment that a ball screw actuator has been described in which the nuts of the actuator are set into a proper relationship for an equal distribution of load and forces amongst the balls transmitting the load and forces applied between the shaft and casing of the actuator. In the embodiment of FIG. 1 the nuts are properly positioned for equal distribution of load and the compressive forces are applied through the balls to avoid yielding between the casing and the shaft on application of a load. This relationship of the nuts is attained without regard to the circumferential relationship of the nuts except for the staggered relation of the crossover grooves. Thus the nuts are in a random circumferential relationship and there is no need for alignment of keyways and the like. The nuts are held in this position by the fitting of the housings around the nuts and applying axial forces to frictionally hold the nuts in the proper relationship for equal distribution of transmitted forces. In the embodiment the maintaining of the proper relationship and the application of the compressive forces are independently performed. As a result, the described actuator is simpler and more easily assembled at a lower cost of manufacture.

Various other modifications and changes may be made without departing from the invention as set forth in the appended claims.

I claim:

1. A ball screw actuator comprising a shaft having a helical thread thereon forming a helical groove, a plurality of nuts each having a helical groove complemental to said shaft and having a continuous set of circulating bearing balls therein, said nuts being spaced axially for uniform preloading with said complemental grooves circumferentially offset and having surfaces lateral to said shaft with facing surfaces in rotatable engagement and two outer housings fitting around said nuts and having radially extending flanges engaging the nuts at opposite ends to prevent relative rotation of said nuts and for holding said nuts under preload.

2. A ball screw actuator comprising a shaft having a helical thread thereon forming a helical groove, a plurality of nuts each having an inner helical groove less than a full turn and a crossover groove between the ends of the helical groove and having a continuous row of bearing balls interfitting between said helical groove and said shaft groove recirculating over said thread through said crossover groove, said nuts formed into two sets with said sets oppositely preloaded for axial movement under preload in both directions and two outer housings fitting around and exteriorly to said nuts and having radially extending flanges engaging the nuts at opposite ends for applying axial force to maintain the preload.

3. A ball screw actuator as set forth in claim 2 wherein the nuts at the adjacent ends of said sets are in engagement for preloading.

References Cited

UNITED STATES PATENTS

| 2,714,821 | 8/1955 | Orner | 74—459 |
| 2,842,278 | 7/1958 | Orner | 74—459 |
| 2,919,596 | 1/1960 | Kuehl | 74—441 |
| 3,141,349 | 7/1964 | McDonald | 74—441 |
| 3,186,249 | 6/1965 | Lanzenberger | 74—441 X |
| 3,198,029 | 8/1965 | Orner. | |

FRED C. MATTERN, Jr., *Primary Examiner.*

LEONARD H. GERIN, *Examiner.*

UNITED STATES PATENT OFFICE
CERTIFICATE OF CORRECTION

Patent No. 3,393,575                          July 23, 1968

Arthur S. Irwin

It is certified that error appears in the above identified patent and that said Letters Patent are hereby corrected as shown below:

Column 4, line 52, "2,842,278" should read -- 2,842,978 --.

Signed and sealed this 2nd day of December 1969.

(SEAL)
Attest:

Edward M. Fletcher, Jr.
Attesting Officer

WILLIAM E. SCHUYLER, JR.
Commissioner of Patents